US012462573B1

(12) United States Patent
Joshi et al.

(10) Patent No.: US 12,462,573 B1
(45) Date of Patent: Nov. 4, 2025

(54) DETECTION AND CLASSIFICATION BASED ON SCENE EMBEDDINGS AND IMAGE EMBEDDINGS

(71) Applicant: Zoox, Inc., Foster City, CA (US)

(72) Inventors: Samir Joshi, Los Altos, CA (US); Shengnan Liang, Pittsburgh, PA (US); Kelly Leece McGuire, San Francisco, CA (US); William Harland Montgomery, IV, Burlingame, CA (US); Peter Scott Schleede, El Dorado Hills, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 18/901,242

(22) Filed: Sep. 30, 2024

(51) Int. Cl.
*G06V 20/56* (2022.01)
*B60W 60/00* (2020.01)
*G06V 10/25* (2022.01)
*G06V 10/764* (2022.01)

(52) U.S. Cl.
CPC ........... *G06V 20/56* (2022.01); *B60W 60/001* (2020.02); *G06V 10/25* (2022.01); *G06V 10/764* (2022.01)

(58) Field of Classification Search
CPC ...... G06V 20/56; G06V 10/25; G06V 10/764; B60W 60/001
USPC ........................................................ 348/148
See application file for complete search history.

(56) References Cited

U.S. PATENT DOCUMENTS

| 10,649,459 | B2 | 5/2020 | Wang et al. |
| 11,386,501 | B1* | 7/2022 | Konrardy ............... G07C 5/008 |
| 11,983,933 | B1* | 5/2024 | Pronovost ............ G06V 10/764 |
| 2019/0236955 | A1* | 8/2019 | Hu .................... G08G 1/096741 |
| 2019/0332875 | A1* | 10/2019 | Vallespi-Gonzalez ....................... G06F 18/217 |
| 2019/0361454 | A1* | 11/2019 | Zeng ..................... G05D 1/0274 |
| 2022/0153310 | A1* | 5/2022 | Yang ..................... G05D 1/0221 |
| 2022/0161811 | A1* | 5/2022 | Lu ...................... B60W 60/0053 |
| 2022/0161824 | A1* | 5/2022 | Refaat ............ B60W 60/00272 |
| 2024/0111025 | A1* | 4/2024 | Wekel .................... G06V 10/82 |
| 2024/0241515 | A1* | 7/2024 | Qian ..................... G01S 13/865 |

\* cited by examiner

*Primary Examiner* — Helen Shibru
(74) *Attorney, Agent, or Firm* — Lee & Hayes, P.C.

(57) ABSTRACT

Techniques for detecting and/or classifying objects in a driving environment are described herein. A vehicle may receive sensor data and input the sensor data into a perception and/or localization component which may be trained to provide processed output data (e.g., bounding boxes, track (s), etc.). In such cases, the vehicle may generate a scene embedding based on the output data. Further, the vehicle may receive image data from an image capturing device on the vehicle. The vehicle may generate an image embedding associated with the image data and concatenate the image embedding with the scene embedding. The vehicle may input the concatenated embedding into a detection and/or classification model to detect and/or classify object(s) within the environment.

20 Claims, 10 Drawing Sheets

DETECTION AND CLASSIFICATION BASED ON SCENE EMBEDDINGS AND IMAGE EMBEDDINGS

BACKGROUND

Vehicles, such as autonomous vehicles, may navigate along designated routes. In some examples, the vehicle may have various sensor devices which may be used to capture sensor data of the environment. The vehicle may use the sensor data to detect and/or classify object(s) in the environment. However, in some circumstances, techniques for detecting and/or classifying object(s) with the sensor data may result in inaccurate and/or suboptimal results.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
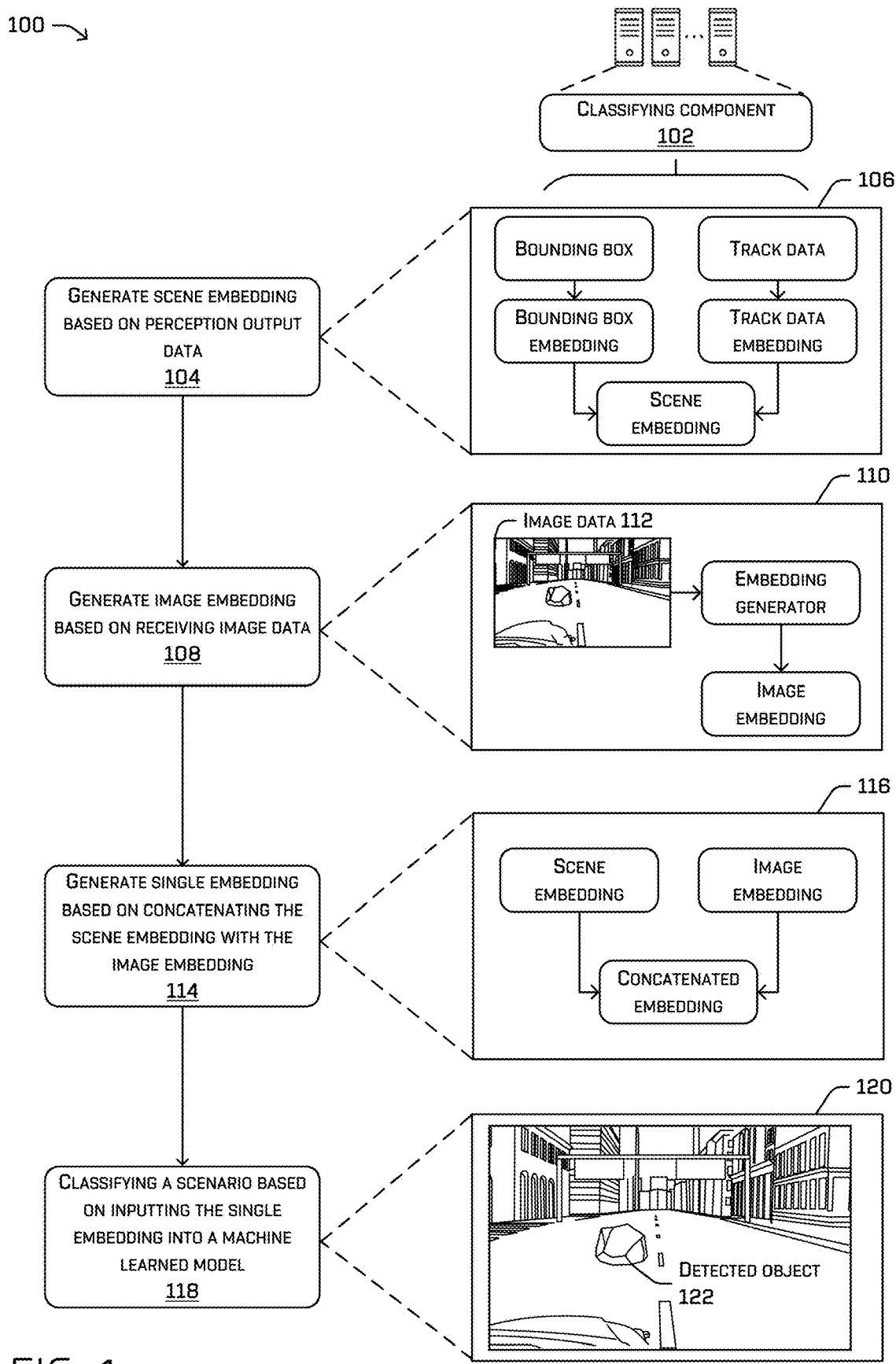
FIG. 1 is a pictorial flow diagram illustrating an example technique for detecting and/or classifying data within an environment based on combining scene and/or image embeddings, in accordance with one or more examples of the disclosure.

Techniques for detecting and/or classifying scenarios, scenes, and/or objects in a driving environment, or otherwise characterizing a driving environment, are described herein. As discussed herein, a combined scene and image embedding may be used to increase the ability of a vehicle to detect and/or classify objects within the environment. In some examples, a vehicle (such as an autonomous vehicle) may receive sensor data from a sensor device associated with the vehicle. The vehicle may input the sensor data into a perception and/or localization component which may be trained to output processed scene data (e.g., bounding boxes, track(s), etc.). In such cases, the vehicle may generate a scene embedding (e.g., arbitrary vector-based representation of the scene) based on the scene data. The vehicle may also receive image data from an image capturing device on the vehicle. Based on receiving the image data, the vehicle may generate an image embedding (e.g., an arbitrary length vector or tensor representative of the image) associated with the image data and generate, by concatenating the image embedding with the scene embedding, a concatenated embedding. The vehicle may input the concatenated embedding into a detection and/or classification model to detect and/or classify scenes, scenario types, and/or object(s) within the environment. As described in more detail below, the techniques described herein may improve vehicle safety and/or driving efficiency by increasing the ability of the vehicle to detect and/classify object(s) and/or other data within the environment which may have otherwise been missed, thereby allowing the vehicle to generate and/or perform safer actions.

When classifying objects in an environment, it may be beneficial to leverage unfiltered sensor data. For example, a vehicle may have various types of sensor devices (e.g., lidar, radar, image capturing, etc.) configured to capture sensor data of an environment. In such cases, the vehicle may use a perception and/or localization component to interpret the sensor data. That is, the vehicle may input the sensor data into the perception and/or localization components which may be designed to output various types of data (e.g., bounding boxes, classifications, velocities, etc.). However, in some circumstances, the output data from the perception and/or localization components may be a sparse representation of what is actually occurring within the environment. That is, the output data may include data that humans have identified as relevant or important. As such, important and/or relevant information in the sensor data may be missed due to the lack of components designed to identify such information. For example, the environment may include a construction worker waving on traffic. However, if the perception component lacks the ability to identify and/or interpret the waving motion of the construction worker, such information may be missed. Missing important and/or relevant information may negatively impact the ability of the vehicle to generate accurate and/or safe trajectories to follow. As such, the techniques and/or systems described herein may increase the ability of classification models to detect and/or classify important information within the environment.

To address these and other technical problems and inefficiencies, the systems and/or techniques described herein may include a classification component (also referred to as an "scenario classifier" or "classification system") configured to detect and/or classify objects in an environment based on combining scene data and raw image data. Technical solutions discussed herein solve one or more problems associated with inaccurate and/or suboptimal object detections and/or classifications.

In some examples, the classification component may receive sensor data from one or more sensor devices while traversing an environment. In some examples, the vehicle may include multiple sensor devices (e.g., lidar device(s), radar device(s), time-of-flight device(s), image capturing device(s), infrared device(s), etc.) configured to receive sensor data of the environment. Such sensor devices may be located at any location on or in the vehicle and may capture sensor data of any portion of the environment. In some examples, each sensor device may provide unique sensor data representative of the perspective of the particular sensor.

In some examples, the classification component may receive scene data from a perception and/or localization component. That is, the vehicle may rely on one or more subsystems and/or components to process and/or interpret the sensor data. For example, the vehicle may include a perception component which may be configured to detect and/or classify object(s) within the environment. Further, the vehicle may include a localization component which may be configured to determine a pose of the vehicle within the world. In such cases, the vehicle may input the sensor data into such components. Based on receiving the sensor data, the perception and/or localization component(s) may analyze the sensor data and output various types of scene data. The scene data may include bounding boxes, classifications, extents, velocities, accelerations, traffic light states, track data, road network data, etc.

In some examples, the classification component may generate scene embeddings for the various types of scene data. The classification component may input the scene data into a machine learned model which may be trained to generate an embedding of the scene data. An embedding may be a structured form of representing data, characteristics, and/or features of an object. In this example, the classification component may generate an embedding for some or all aspects of the scene data. As an example, if the scene data includes three bounding boxes, the classification component may generate a unique embedding for each of the three bounding boxes. Based on generating the embeddings for each piece of data in the scene data, the classification component may determine a single embedding for each type of scene data. That is, continuing the example above, for the three bounding boxes, the detection component may determine a single bounding box embedding by mean pooling the three bounding box embeddings. As such, the classification component may determine a single embedding for each type of data in the scene data. Examples of techniques for generating and/or utilizing scene embeddings can be found, for example, in U.S. patent application Ser. No. 18/526,999, filed Dec. 1, 2023, and titled "Multimodal Masked Driving Scene Encoder," U.S. patent application Ser. No. 18/641,052, filed Apr. 19, 2024, and titled "Contrastive Trained Driving Scene Model With Multiple Encoders," U.S. patent application Ser. No. 18/375,255, filed Sep. 29, 2023, and titled "Database Generation Including Predicted Scenarios," U.S. patent application Ser. No. 18/087,570 entitled "Generating Object Representations Using a Variable Autoencoder" filed on Dec. 22, 2022, the contents of all of which are herein incorporated by reference in their entirety and for all purposes.

In some examples, the classification component may generate a single scene embedding based on the various embeddings of the type(s) of data in the scene data. The classification component may determine the single scene embedding by concatenating the multiple scene embeddings together. Concatenating the embeddings may include combining the multiple embeddings into a single embedding such that the data from each embedding is included in the single scene embedding. As described in more detail below, the classification component may combine the single scene embedding with the image embedding (described below).

In some examples, the vehicle may receive image data from an image capturing device mounted on or located in the vehicle. That is, the vehicle may include one or more image capturing devices configured to capture image data. The image data may be represented in a two-dimensional plane and may include one or more pixels organized in rows and columns.

Based on receiving the image data, the classification component may generate an image embedding associated with the image data. That is, the classification component may generate the image embedding prior to inputting the image data into the perception and/or localization components. The classification component may generate the image embedding by inputting the image data into a machine learned model which may be trained to provide, as output, an image embedding. In some cases, the classification component may input the entire image data into the machine learned model; however, in other cases, the classification component may input sections or portions of the image data (e.g., subsets of image data that excludes other subsets of the image data) into the machine learned model.

For example, if the classification component inputs the entire image data into the machine learned model, the machine learned model may output a single image embedding. In such cases, the machine learned model may generate the embedding based on analyzing all parts of the image data. Based on generating the image embedding, the classification component may concatenate the image embedding with the scene embedding. That is, the classification component may generate a single embedding by combining the scene and image embeddings. Based on generating the concatenated embedding, the classification component may input the concatenated embedding into one or more classification and/or detection models which may be trained to analyze, detect, and/or classify scenes, types of scenarios, and/or objects within the environment. These detections and/or classifications may be sent to downstream systems (e.g., prediction and/or planning) which may analyze and/or plan vehicle actions.

Alternatively, if the classification component inputs a portion of the image data into the machine learned model, the classification component may identify portions of the image to input into the machine learned model. The classification component may identify the portion of the image by determining or receiving bounding boxes from the perception scene data or from inputting the image data into a machine learned model, projecting the bounding boxes into the image data, receiving the pixels of the image data (or other type of data associated with a different modality) that are within the bounding boxes, and/or generating embeddings (e.g., inputting the pixels into the machine learned model) based on the pixels within the bounding boxes. In such cases, when generating the embeddings, the machine learned model may generate an embedding for the content within each bounding box. As such, the classification component may determine the single image embedding by concatenating the embeddings for each bounding box. In this case, the classifying component may concatenate the single image embedding with the scene embedding and proceed to perform classification on the concatenated embedding.

Alternatively or additionally, the classifying component may concatenate the embeddings of the image data within the bounding boxes to the embeddings generated from the scene data. That is, the classifying component may identify the scene embedding that corresponds to the bounding box that was projected into the image data and concatenate the image data embedding to the associated scene data embedding. In this case, the classifying component may concatenate the multiple scene data embeddings into a single scene embedding and perform classification and/or detection based on the single scene embedding. Additional description of such techniques is described in FIGS. 3D-3F.

In some examples, the vehicle may be controlled based on the detection and/or classification operations. That is, based on detecting and/or classifying a scene, a scenario, and/or an object(s) within the environment, the classifying component may send such data to downstream components such as prediction and/or planning. The downstream components may analyze the detected and/or classified data to determine actions for the vehicle to perform.

Though it has been described that an image embedding is combined with the scene embedding, in other examples, the classifying component may use the embedding of any other type of sensor data. For example, the classifying component may receive lidar data, radar data, audio data, environmental data (e.g., weather data), time-of-flight data, etc. and generate an embedding associated therewith. In such cases, the classifying component may concatenate the sensor data embedding with the scene embedding which may then be used to perform detection and/or classification.

The techniques described herein can improve the functioning, safety, and efficiency of the autonomous and semi-autonomous vehicles operating in various driving environments. Utilizing raw image data may result in an increased ability of the vehicle to detect and/or classify objects within the environment. The increased ability to detect objects may lead to the vehicle generating and/or following more accurate and safer vehicle actions.

The techniques described herein may be implemented in several ways. Example implementations are provided below with reference to the following figures. Although discussed in the context of an autonomous vehicle, the methods, apparatuses, and systems described herein may be applied to a variety of systems, and are not limited to autonomous vehicles. In another example, the techniques may be utilized in an aviation or nautical context, or in any other system. Additionally, the techniques described herein may be used with real data (e.g., captured using sensor(s)), simulated data (e.g., generated by a simulator), or any combination of the two.

FIG. 1 is a pictorial flow diagram illustrating an example process 100 for detecting and/or classifying data within an environment based on combining scene and/or image embeddings. As shown in this example, some or all of the operations in the example process 100 may be performed by a classifying component 102, a perception component, a prediction component, a planning component, and/or any other component or system within an autonomous vehicle.

At operation 104, the classifying component 102 may generate a scene embedding based on perception output data. That is, a vehicle may include one or more components or systems that are designed to interpret the environment within which the vehicle navigates. In such cases, the vehicle may capture sensor data and input the sensor data into the perception and/or localization components of the vehicle. The perception and/or localization components may analyze the sensor data and output scene data that includes detected objects, bounding boxes, traffic lights, velocities, etc. In such cases, the classifying component 102 may generate an embedding based on the scene data. For example, box 106 illustrates generating a scene embedding based on scene data. In this example, the box 106 may include scene data which may include the bounding boxes and the track data. Of course, in other examples, the scene data may include more or fewer types of scene data (e.g., road network data, traffic data, etc.). As shown, the classifying component 102 may generate an embedding for each type of scene data. That is, the classifying component 102 may generate an embedding for the bounding boxes and a separate embedding for the track information. In some examples, the classifying component 102 may generate the single scene embedding by combining (or concatenating) the embedding of the bounding box with the embedding of the track data.

At operation 108, the classifying component 102 may generate an image embedding based on receiving image data. That is, the vehicle may include image capturing devices configured to capture image(s) of the environment. For example, box 110 illustrates generating an image embedding from the image data. In this example, box 110 includes image data 112. The image data 112 may be captured by any camera on the vehicle. Though it is shown that the classifying component 102 receives a single image from a single camera, in other examples the classifying component 102 may receive multiple images from one or more different cameras. Further, in other examples, the classifying component 102 may perform attention of the multiple images to determine which image may be the most relevant and use the relevant image in operation 108.

Based on receiving the image data 112, the detecting component 102 may input the image data 112 into an embedding generator. As shown, box 110 may include an embedding generator which may receive the image data 112 as input and provide, as output, the image embedding. As described in more detail in FIGS. 3A-3F, the embedding generator may generate the image embedding with the entire image data 112 or with a portion of the image data 112.

At operation 114, the classifying component 102 may generate a single embedding based on concatenating (or aggregating) the scene embedding with the image embedding. That is, the classifying component 102 may generate a single embedding that includes the data from the scene embedding and the data from the image embedding. For example, box 116 illustrates concatenating the scene and/or image embeddings. In this example, the box 116 includes the scene embedding as determined at operation 104 and the image embedding as determined at operation 108. As shown, the classifying component 102 may concatenate the scene embedding and the image embedding into a single embedding. However, this is not intended to be limiting; in other examples, the classifying component 102 may use the image embedding and the scene embedding as distinct embeddings.

At operation 118, the classifying component 102 may classify a scenario based on inputting the combined embedding into a machine learned model. That is, after generating the combined embedding, the classifying component 102 may send the combined embedding to downstream systems which may use the embedding for various purposes. In some cases, the embedding may be used for scene, scenario, and/or object classification. For example, the box 120 illustrates the classify the scenario within box 120 as including a static object. That is, box 120 illustrates that the classifying component 102 was able to detect an object 122 within the driving environment. As shown, the object 122 may be a rock; however, in other examples, the object 122 may be any other type of static or dynamic object.

Figure 2:
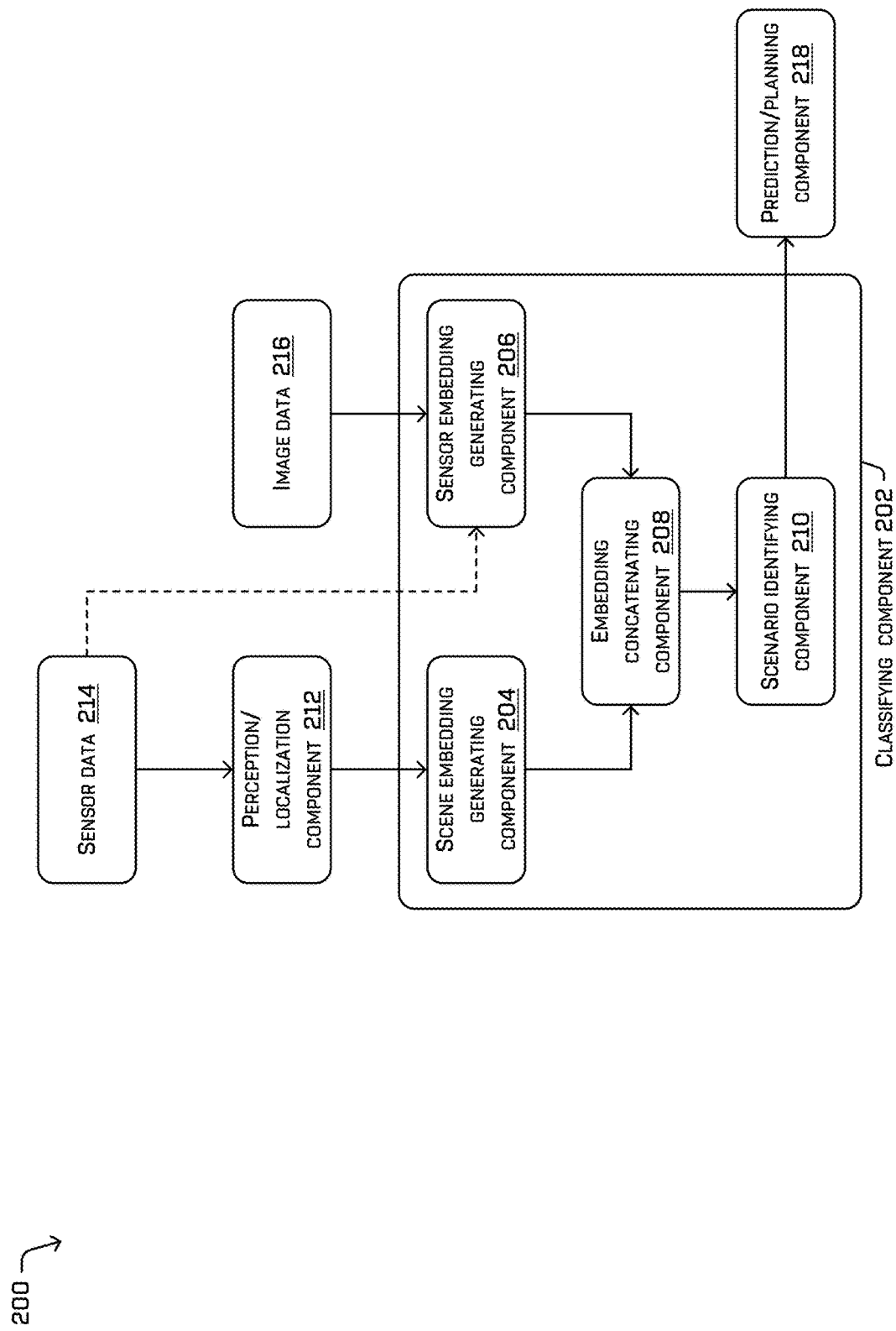
FIG. 2 illustrates an example computing system including a classification component configured to generate an embedding from scene data and/or image data, in accordance with one or more examples of the disclosure.

FIG. 2 illustrates an example computing system 200 including a classifying component 202 configured to generate an embedding from scene data and/or image data.

In some examples, the classifying component 202 may be similar or identical to the classifying component 102 described above, or in any other examples herein. As noted above, in some cases the classifying component 202 may be implemented within an autonomous vehicle or offline from the vehicle. In some examples, the classifying component 202 may include various components, described below, configured to perform different functionalities of a technique for object detection and/or classification. In some examples, the classifying component 202 may include a scene embedding generating component 204 configured to generate scene embeddings, an senso embedding generating component 206 configured to generate image embeddings, an embedding concatenating component 208 configured to concatenate the image and scene embeddings, and/or an scenario identifying component 210 configured to classify a scene, scenario, and/or object(s) within the environment.

In some examples, the classifying component 202 may receive scene data from a perception and/or localization component 212. That is, as shown, FIG. 2 may include a perception and/or localization component 212 which may receive sensor data 214. The sensor data 214 may be captured or received from one or more sensor devices of the same or different modality. Such sensor device(s) may be located on or in the vehicle. In some examples, the sensor data 214 may span a period of time (e.g., sensor data from five second period of time, etc.). As shown, the sensor data 214 may be input into the perception and/or localization component 212 such that the perception and/or localization component 212 may interpret what is in the environment. In such cases, the perception and/or localization component 212 may analyze the sensor data 214 and output scene data (e.g., bounding boxes, detected objects, track data, etc.) to the scene embedding generating component 204.

In some examples, the classifying component 202 may include a scene embedding generating component 204 configured to generate scene embeddings. The scene embedding generating component 204 may receive the scene data from the perception and/or localization component 212. In some examples, the scene embedding generating component 204 may generate scene embeddings for some or all types of scene data by inputting the scene data into a machine learned model which may output the scene embeddings. In this case, the scene embedding generating component 204 may generate a single scene embedding by concatenating the multiple scene embeddings for the types of scene data into a single, combined scene embedding.

In some examples, the classifying component 202 may receive image data 216 from one or more image capturing devices. That is, the vehicle may include one or more image capturing devices which may be configured to capture images of the environment. In such cases, the image data 216 may be sent to the sensor embedding generating component 206. In some examples, the image data 216 may include one or more images from one or more image capturing devices.

In some examples, the classifying component 202 may include a sensor embedding generating component 206 configured to generate sensor data embeddings. The sensor embedding generating component 206 may receive the image data 216 from one or more image capturing devices. In such cases, the sensor embedding generating component 206 may generate an embedding of the image data 216. In some examples, when the image data 216 includes multiple images, the sensor embedding generating component 206 may perform attention on the multiple images to determine which image to embed. Additionally or alternatively, the sensor embedding generating component 206 may combine the images into a single image and generate an embedding based on the combined image. As described in FIGS. 3A-3F, the sensor embedding generating component 206 may generate the image embedding using the entire image or a portion of the image. Additionally or alternatively, the sensor embedding generating component 206 may receive various modalities of sensor data 214. In such cases, the sensor embedding generating component 206 may receive lidar data, radar data, audio data, environmental data, etc. In such cases, the sensor embedding generating component 206 may generate an embedding based on such data.

In some examples, the classifying component 202 may include an embedding concatenating component 208 configured to concatenate the image and scene embeddings. The embedding concatenating component 208 may receive the scene embedding from the scene embedding generating component 204 and the image embedding from the sensor embedding generating component 206. In such cases, the embedding concatenating component 208 may generate a single embedding by concatenating the image embedding with the scene embedding.

In some examples, the classifying component 202 may include an scenario identifying component 210 configured to classify a scenario, scene, and/or object. The scenario identifying component 210 may receive the combined embedding and input the combined embedding into a classifier and/or detector model. In such cases, the classifier and/or detector model may be trained to detect and/or classify types of scenarios, driving scenes, and/or objects within the environment. However, this is not intended to be limiting; in other examples, the scenario identifying component 210 may receive the scene embedding and the image embedding and may use such embeddings to classify scenarios, scenes, and/or objects in the environment. In such cases, the scenario identifying component 210 may input both embeddings into a classifier and/or detector. In other cases, the object scenario component 210 may perform attention on the scene and image embeddings and input the relevant embedding into the classifier and/or detector.

As shown, the scenario identifying component 210 may send the classified and/or detected information to a prediction and/or planning component 218. The prediction and/or planning component 218 may analyze the data identified by the scenario identifying component 210 when determining actions for the vehicle to perform. However, this is not intended to be limiting; in other examples, the scene and image embeddings and/or the identified data may be used in training the machine learned models. That is, the machine learned models may analyze the scene and/or image embeddings to train models in classification and/or embedding generation. Examples of techniques for training scene encoders using the scene and/or image embeddings can be found, for example, in U.S. patent application Ser. No. 18/526,999, filed Dec. 1, 2023, and titled "Multimodal Masked Driving Scene Encoder," U.S. patent application Ser. No. 18/641,052, filed Apr. 19, 2024, and titled "Contrastive Trained Driving Scene Model With Multiple Encoders," U.S. patent application Ser. No. 18/375,255, filed Sep. 29, 2023, and titled "Database Generation Including Predicted Scenarios," U.S. patent application Ser. No. 18/087,570 entitled "Generating Object Representations Using a Variable Autoencoder" filed on Dec. 22, 2022, the contents of all of which are herein incorporated by reference in their entirety and for all purposes.

Further, in other examples, the scenario identifying component 210 may send the classification information and/or the associated embeddings to a validation system or component which may be configured to determine that received data is accurate (e.g., correct type of classification).

FIGS. 3A-3F are pictorial flow diagrams illustrating an example process 300 for detecting and/or classifying object(s) within an environment based on raw image data. As shown in this example, some or all of the operations in the example process 300 may be performed by a classifying component, a perception component, a prediction component, a planning component, and/or any other component or system within an autonomous vehicle.

Figure 3A:
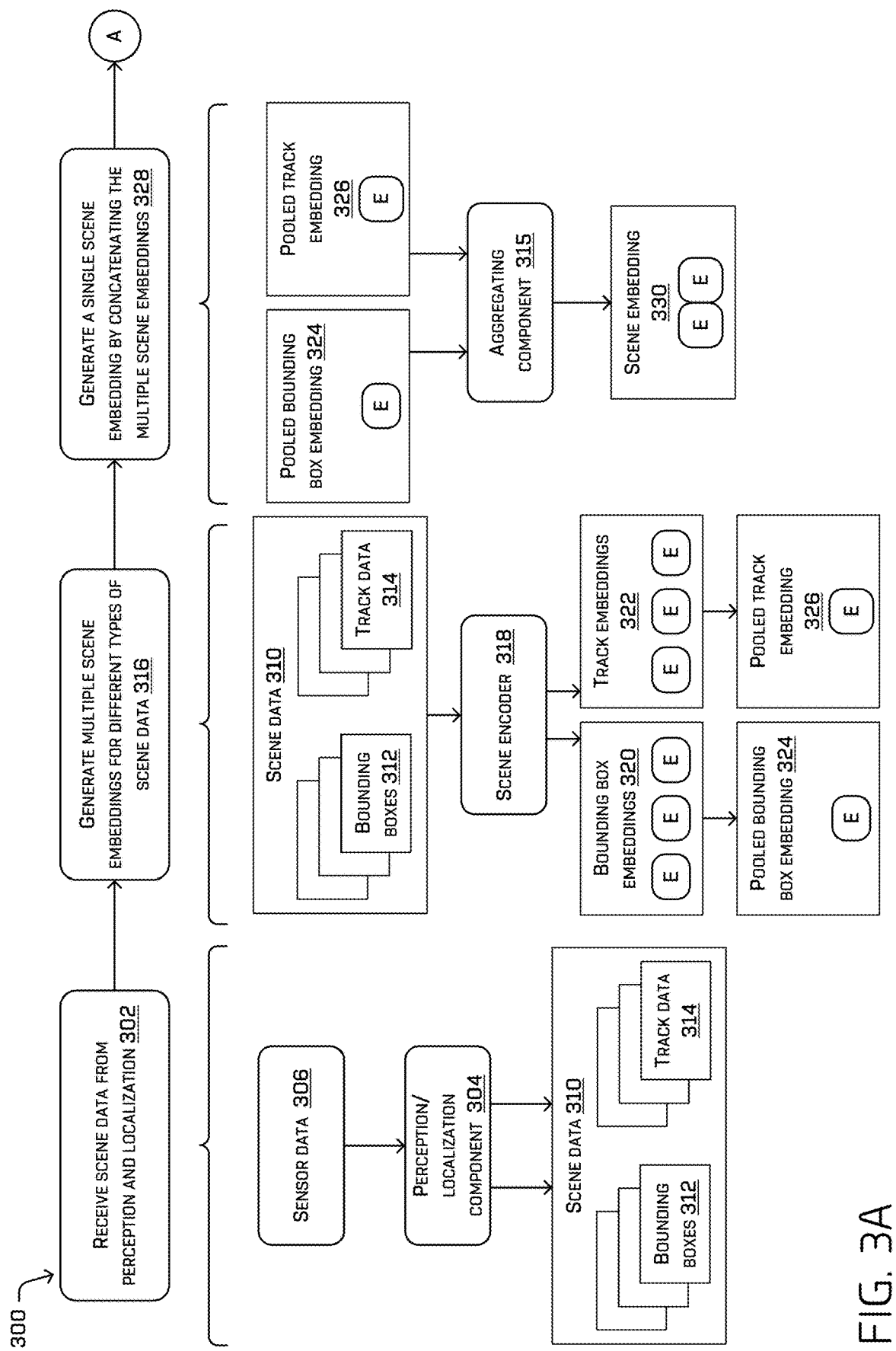
FIGS. 3A-3F are pictorial flow diagrams illustrating an example technique for detecting and/or classifying object(s) within an environment based on raw image data, in accordance with one or more examples of the disclosure.

FIG. 3A illustrates generating a scene embedding from perception output data.

At operation 302, the classifying component may receive scene data from perception and/or localization components.

In some examples, a vehicle may receive sensor data and input such data into a one or more systems that are trained to interpret the data. For example, as shown in the region below operation 302, a perception and/or localization component 304 may receive sensor data 306. The sensor data 306 may be captured by one or more sensor devices associated with the vehicle. Additionally, the sensor data 306 may include data that was captured at different timesteps. That is, the sensor data 306 may include data that was captured over a five second time frame, eight second time frame, etc.

As shown, the sensor data 306 may be input into the perception and/or localization component 304. In this example, the perception and/or localization component 304 may analyze the sensor data 306 and output scene data 310. As shown, the scene data 310 may include various types which may include bounding boxes, track data, traffic information, etc. In this example, the scene data 310 may include bounding boxes 312 (e.g., three bounding boxes) and tracks 314 (e.g., three tracks). Of course, in other examples, the scene data 310 may include other types of data such as map data, traffic data, road network data, etc. The multiple bounding boxes 312 may correspond to the same region of the environment over a period of time or different regions of the environment at the same timestep.

At operation 316, the classifying component may generate multiple scene embeddings for different types of scene data. That is, as shown, the classifying component may input the scene data 310 into a scene encoder 318 which may be trained to output embeddings associated with the different aspects of the scene data 310. For example, the scene encoder 318 may output bounding box embeddings 320 and track embeddings 322. As shown, the bounding box embeddings 320 may include three separate embeddings—one for each of the three bounding boxes 312. Similarly, the track embeddings 322 may include three separate embeddings—one for each of the tracks 314.

Based on generating the various embeddings, the classifying component may generate a single embedding for each type of scene data 310. That is, the classifying component may generate a single embedding for the bounding boxes 312 and a single embedding for the tracks 314. In such cases, the classifying component may generate a bounding box embedding 324 based on pooling (e.g., mean pooling and/or any other type of pooling) the bounding box embeddings 320. Further, the classifying component may generate a track data embedding 326 based on pooling the track embeddings 322.

At operation 328, the classifying component may generate a single scene embedding by concatenating the multiple scene embeddings. That is, as shown, the classifying component may send the pooled data to an aggregating component 315 which may be configured to concatenate the bounding box embedding 324 with the track data embedding 326. Alternatively, the aggregating component 315 may aggregate the embeddings by performing a pooling operation and/or any other type of combining operation. As such, the concatenated embedding may be illustrated as the scene embedding 330. As shown, the scene embedding 330 includes the embedding from the bounding box embedding 324 and the embedding from the track data embedding 326.

Figure 3B:
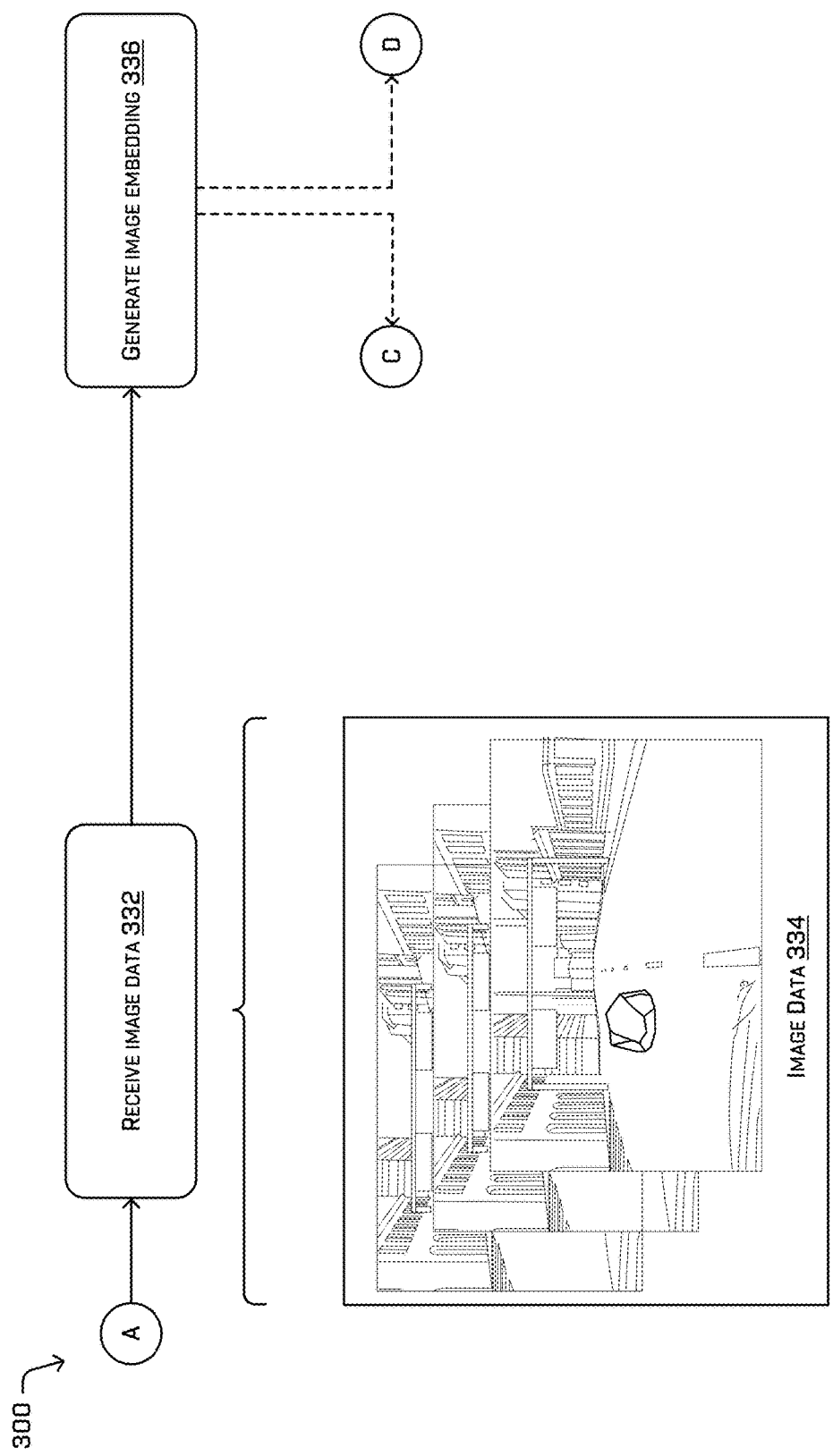

In some examples, the process 300 may continue on FIG. 3B.

FIG. 3B illustrates receiving image data 334 and generating an image embedding from such data.

At operation 332, the classifying component may receive image data 334. As described above, the vehicle may include one or more image capturing devices that can capture images of the environment. For example, FIG. 3B illustrates image data 334. As shown, image data 334 may include multiple images from one or more cameras captured at the same or different times. However, this is not intended to be limiting; in other examples, there may be more or fewer images associated with the image data 334. The images may be two-dimensional representations of the environment.

At operation 336, the classifying component may generate an image embedding based on the sensor data. As described above, the classifying component may generate the image embedding by inputting the image data 334 into a machine learned model trained to output image embeddings. In some examples, when generating the image data, the classifying component may input the entire image into the machine learned model and in other examples the classifying component may input a portion of the image into the machine learned model. As shown by the dashed lines extending from operation 336, the classifying component may proceed by inputting the entire image into the machine learned model at FIG. 3C. Alternatively, the classifying component may proceed by inputting a portion of the image into the machine learned model at FIG. 3D.

Figure 3C:
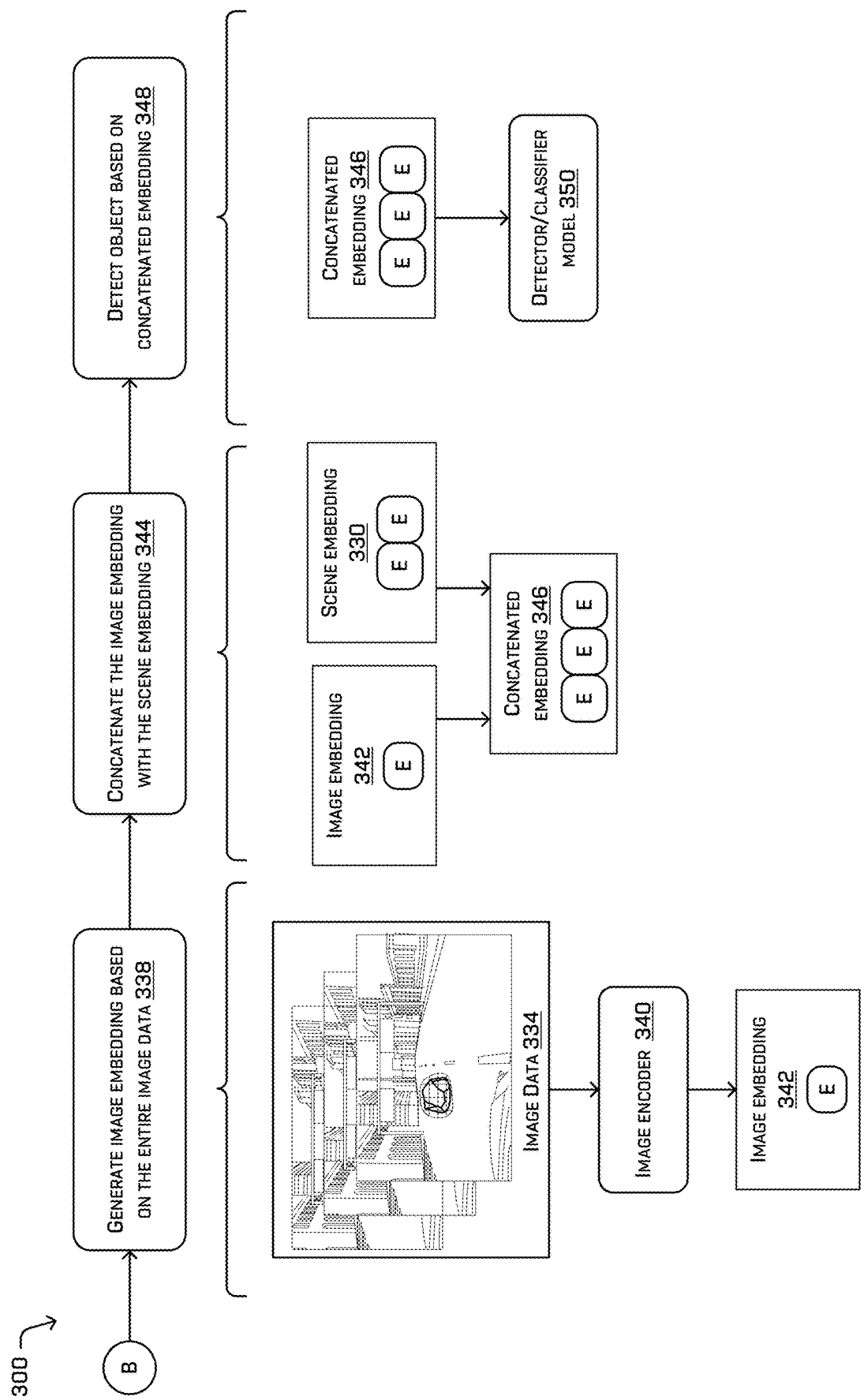

FIG. 3C illustrates classifying and/or classifying object(s) within the environment based on using the entire image data.

At operation 338, the classifying component may generate an image embedding based on the entire image. That is, the classifying component may input the entire image into the machine learned model that is trained to generate image embeddings. For example, the region below operation 338 illustrates inputting the entire image data 334 into the image encoder 340 which may be trained to output an image embedding 342. As shown, the image encoder 340 may output a single image embedding 342. When inputting the image data 334 into the image encoder 340, the classifying component may input each image individually, generate a combined image and input the combined image, and/or perform an attention operation between the images to identify the most relevant image and input the most relevant image into the image encoder 340.

At operation 344, the classifying component may concatenate (or aggregate using any other type of technique (e.g., pooling)) the image embedding 342 with the scene embedding 330. That is, as shown, the classifying component may combine the image embedding 342 and the scene embedding 330 into a single, combined embedding. The single, concatenated embedding 346 may include the data associated with the image embedding 342 and the data associated with the scene embedding 330. As shown, the concatenated embedding 346 includes the three embeddings combined.

At operation 348, the classifying component may detect an object based on the concatenated embedding 346. That is, one or more components within the classifying component and/or downstream to the classifying component may rely on the concatenated embedding 346 to interpret the environment. In such cases and as shown, the classifying component may input the concatenated embedding 346 into a detector and/or classifier model 350 which may be trained to output object detections and/or classifications. The planning component of the vehicle may rely on such data to control the vehicle.

Figure 3D:
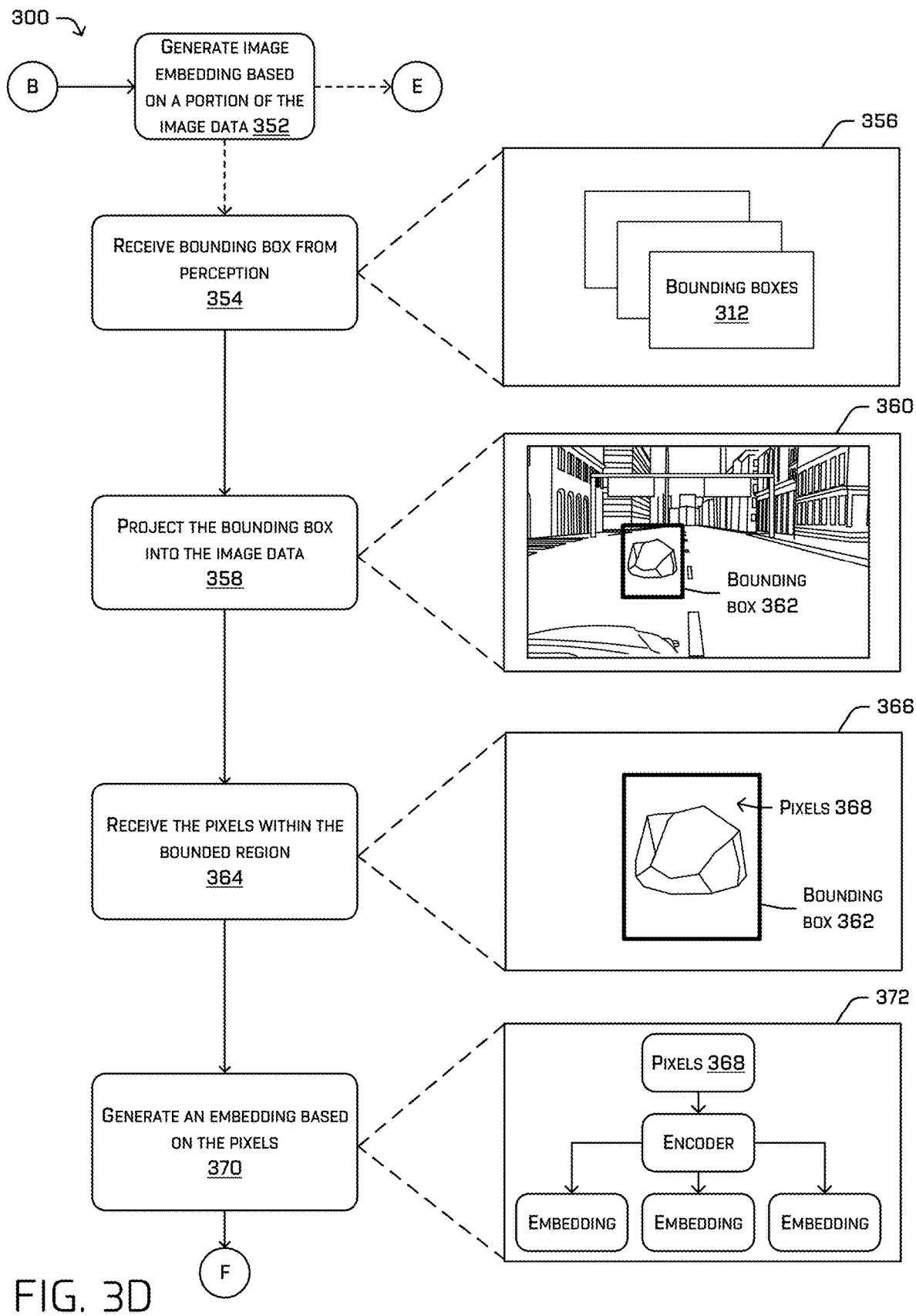

FIG. 3D illustrates generating image embeddings based on a portion of the image data. That is, FIG. 3D continues the operations performed in FIG. 3B.

At operation 352, the classifying component may generate an image embedding based on a portion of the image data 334. As shown, the classifying component may perform such operations using the techniques described in FIG. 3D or by using the techniques described in FIG. 3E.

At operation 354, the classifying component may receive a bounding box from perception. That is, as described in FIG. 3A, the classifying component may receive various types of scene data that are output from a perception component. In some cases, the scene data may include one or more bounding boxes. As such, in this examples, the classifying component may retrieve the bounding boxes that were output by the perception component. For example, box 356 illustrates the bounding boxes that were output by the perception component. In this example, the box 356 includes the bounding boxes 312 as output by perception.

At operation 358, the classifying component may project a bounding box into the image data 334. That is, to identify the portion of the image data to embed, the classifying component may project the bounding box into the image data and embed the content within the bounds of the bounding box. For example, box 360 illustrates projecting one of the bounding boxes 312 into the image data 334. In this example, bounding box 362 may be projected into the image data 334. The bounding box 362 may be associated with the bounding boxes 312. When projecting the bounding box 362 into the image data 334, the classifying component may determine a location of the bounding box 362 in a two dimensional space and project the bounding box 362 into the two dimensional image based on the location.

At operation 364, the classifying component may receive the pixels within the bounded region. That is, the classifying component may identify the pixels that include a position (e.g., row and/or column) that is within the extent or bounds of the bounding box 362. For example, box 366 illustrates identifying the pixels within the bounding box 362. As shown, the box 366 may include the content or pixels 368 that are located within the bounding box 362.

At operation 370, the classifying component may generate an embedding based on the pixels 368. That is, the classifying component may generate an image embedding for the pixels inside each bounding box. As such, in this example, since the bounding boxes 312 included three separate bounding boxes, the classifying component may project each of the three bounding boxes into the image data, receive three separate sets of pixels, and generate three separate embeddings. For example, box 372 illustrates inputting the pixels 368 into an encoder which may be trained to output an associated embedding. In this example, box 372 includes two additional embeddings which may correspond to the embeddings associated with the set of pixels from the other two bounding boxes in the bounding boxes 312. In some cases, the operations may continue in FIG. 3F.

Figure 3E:
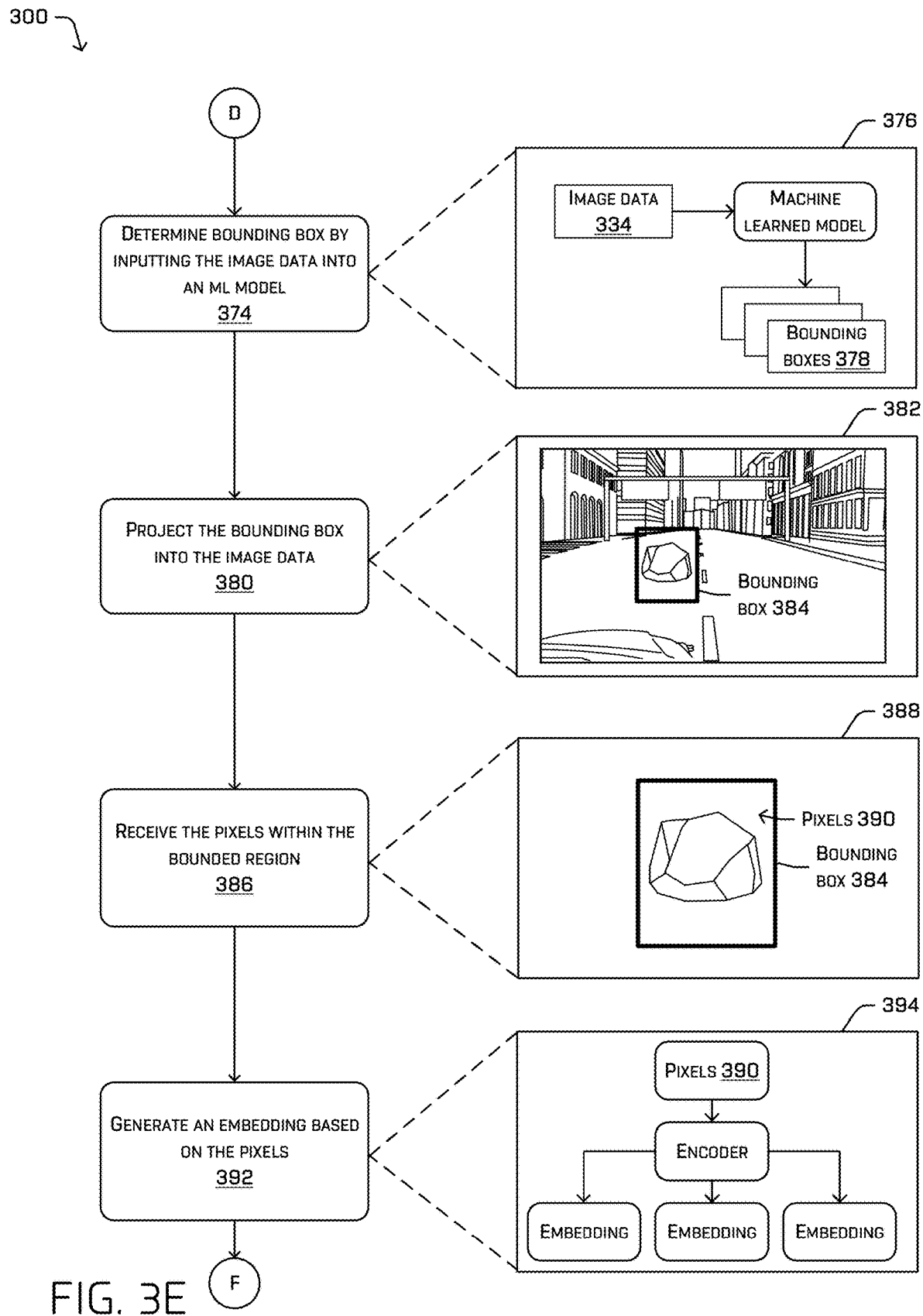

FIG. 3E illustrates generating image embeddings based on portions of image data.

At operation 352, the classifying component may generate an image embedding based on a portion of the image data 334. As noted above, the classifying component may generate the embeddings using the techniques on FIG. 3D or the techniques on FIG. 3E.

At operation 374, the classifying component may determine bounding boxes by inputting the image data into a machine learned model. That is, the classifying component may identify the portions of the image data to use when generating the image embeddings by projecting bounding boxes into the image data. In some cases, the classifying component may determine the bounding boxes by using one or more machine learned models. For example, box 376 illustrates determining bounding boxes using a machine learned model. In this example, box 376 includes the image data 334 being input to the machine learned model. In some cases, the machine learned model may generate bounding boxes 378 based on detecting and/or classifying objects within the environment. The bounding boxes 378 may be different than the bounding boxes 312 as output by the perception component.

At operation 380, the classifying component may project a bounding box into the image data. For example, box 382 illustrates projecting one of the bounding boxes 378 into the image data 334. In this example, bounding box 384 may be projected into the image data 334. The bounding box 384 may be associated with the bounding boxes 378. When projecting the bounding box 384 into the image data 334, the classifying component may determine a location of the bounding box 384 in a two dimensional space and project the bounding box 384 into the two dimensional image based on the location.

At operation 386, the classifying component may receive the pixels within the bounded region. That is, the classifying component may identify the pixels that include a position (e.g., row and/or column) that is within the extent or bounds of the bounding box 384. For example, box 388 illustrates identifying the pixels within the bounding box 384. As shown, the box 388 may include the content or pixels 390 that are located within the bounding box 384.

At operation 392, the classifying component may generate an embedding based on the pixels 390. That is, the classifying component may generate an image embedding for the pixels inside each bounding box. As such, in this example, since the bounding boxes 378 included three separate bounding boxes, the classifying component may project each of the three bounding boxes into the image data, receive three separate sets of pixels, and generate three separate embeddings. For example, box 394 illustrates inputting the pixels 390 into an encoder which may be trained to output an associated embedding. In this example, box 394 includes two additional embeddings which may correspond to the embeddings associated with the set of pixels from the other two bounding boxes in the bounding boxes 378. In some cases, the operations may continue in FIG. 3F.

Figure 3F:
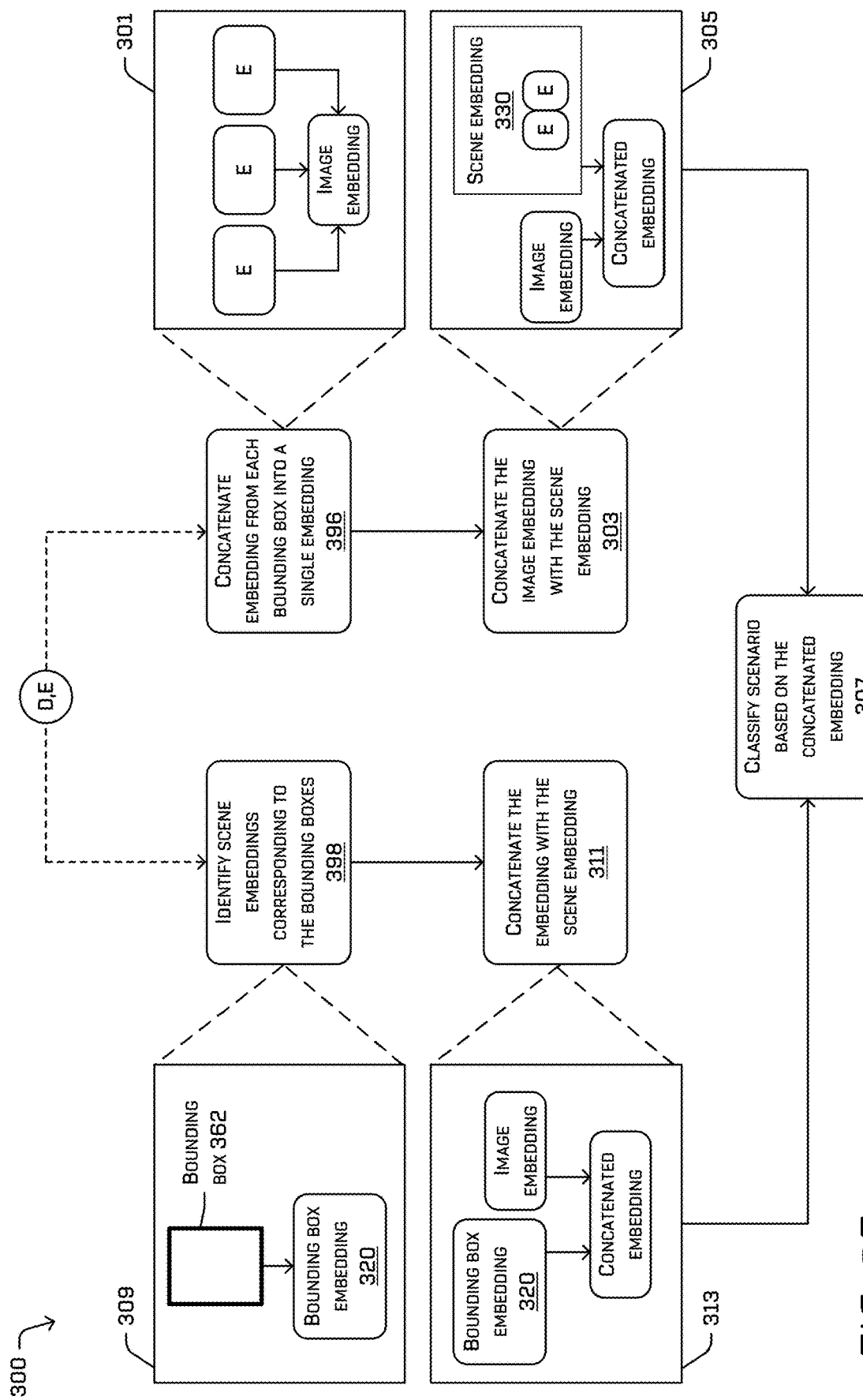

FIG. 3F illustrates generating an embedding from the image embeddings that can be input into classifier and/or detector model. As shown by the dashed lines, the detecting model may perform the techniques starting at operation 396 or the operations starting at operation 398.

At operation 396, the classifying component may concatenate (or aggregate using any other type of technique (e.g., pooling)) the embedding from each bounding box (as shown in box 372 or box 394) into a single embedding. That is, the classifying component may determine the multiple embeddings from the pixels within the bounds of the multiple bounding boxes. As such, the classifying component may concatenate the embeddings into a combined image embedding. For example, box 301 illustrates concatenating multiple embeddings into a combined image embedding. In this example, the three boxes with an "E" inside may be the embeddings generated at operation 370 or at operation 392. In such cases, the classifying component may combine the three embeddings into a single image embedding.

At operation 303, the classifying component may concatenate (or aggregate using any other type of technique (e.g., pooling)) the image embedding with the scene embedding. That is, the classifying component may generate a combined embedding that includes the content of the combined image embedding and the content of the scene embedding 330. For example, box 305 illustrates concatenating the image and scene embeddings. In this example, the box 305 may include the image embedding generated at operation 396 and the scene embedding 330. The classifying component may combine such embeddings into a single, concatenated embedding. At operation 307, the classifying component may classify a scenario based on the concatenated (or aggregated) embedding. That is, the classifying component may input the concatenated embedding into one or more detector and/or classifier models trained to detect and/or classify scenes, scenarios, and/or objects within an environment.

Following the alternative technique, at operation 398, the classifying component may identify the scene embeddings that correspond to the bounding boxes. That is, as discussed in FIG. 3D, the classifying component may retrieve the bounding boxes that were output by the perception and/or localization components. In this example, the classifying component may concatenate the image embeddings to the scene embeddings that were generated for the bounding boxes. That is, the classifying component may identify the bounding box used to project into the image data, determine the scene embedding that corresponds to the bounding box, and concatenate the image embedding generated from the pixels within the bounding box to the scene embedding that corresponds to the bounding box. For example, box 309 illustrates the bounding box and the embedding associated therewith. In this example, the box 309 includes the bounding box 362. The bounding box 362 may be a bounding box output by the perception and/or localization components and used to project into the image data 334. Further, the box 309 includes the bounding box embedding 320 that corresponds to the bounding box 362. That is, the bounding box embedding 320 may be the embedding generated in FIG. 3A that corresponds to the bounding box 362.

At operation 311, the classifying component may concatenate (or aggregate using any other type of technique (e.g., pooling, sums, etc.)) the image embedding with the scene (or bounding box) embedding. That is, the classifying component may combine the bounding box embedding 320 with the image embedding that was generated from the pixels contained within the bounding box 362. For example, box 313 illustrates combining the bounding box embedding 320 with the image embedding generated at operation 370 or at operation 392. In this example, the bounding box embedding 320 may be concatenated with the image embedding determined in FIG. 3D or 3E. In such cases, the classifying component may generate a concatenated embedding such that the content of the bounding box embedding 320 and the content within the image embedding are included in the concatenated embedding. At operation 307, the classifying component may classify a scene, scenario, and/or object based on the concatenated (or aggregated) embedding. That is, the classifying component may input the concatenated embedding into one or more detector and/or classifier models trained to detect and/or classify objects within an environment.

Figure 4:
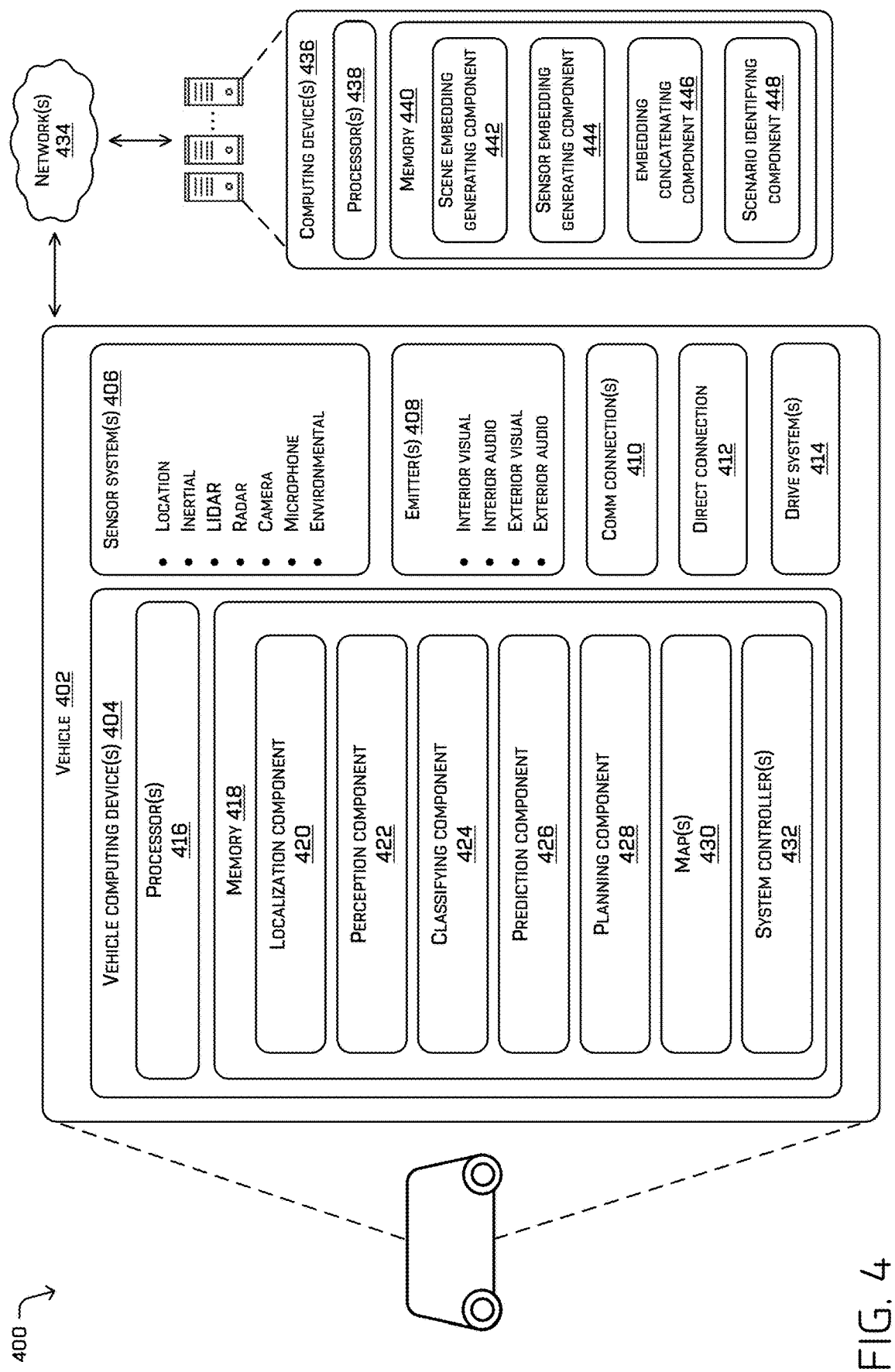
FIG. 4 depicts a block diagram of an example system for implementing various techniques described herein.

FIG. 4 is a block diagram of an example system 400 for implementing the techniques described herein. In at least one example, the system 400 may include a vehicle, such as vehicle 402. The vehicle 402 may include one or more vehicle computing devices 404, one or more sensor systems 406, one or more emitters 408, one or more communication connections 410, at least one direct connection 412, and one or more drive systems 414.

The vehicle computing device 404 may include one or more processors 416 and memory 418 communicatively coupled with the processor(s) 416. In the illustrated example, the vehicle 402 is an autonomous vehicle; however, the vehicle 402 could be any other type of vehicle, such as a semi-autonomous vehicle, or any other system having at least an image capture device (e.g., a camera-enabled smartphone). In some instances, the autonomous vehicle 402 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 402 may be a fully or partially autonomous vehicle having any other level or classification.

In the illustrated example, the memory 418 of the vehicle computing device 404 stores a localization component 420, a perception component 422, a classifying component 424, a prediction component 426, a planner component 428, one or more system controllers 432, and one or more maps 430 (or map data). Though depicted in FIG. 4 as residing in the memory 418 for illustrative purposes, it is contemplated that the localization component 420, the perception component 422, the classifying component 424, the prediction component 426, the planner component 428, system controller(s) 432, and/or the map(s) may additionally, or alternatively, be accessible to the vehicle 402 (e.g., stored on, or otherwise accessible by, memory remote from the vehicle 402, such as, for example, on memory 440 of one or more computing device 436 (e.g., a remote computing device)). In some examples, the memory 440 may include a scene embedding generating component 442, a sensor embedding generating component 444, an embedding concatenating component 446, and/or an scenario identifying component 448.

In at least one example, the localization component 420 may include functionality to receive sensor data from the sensor system(s) 406 to determine a position and/or orientation of the vehicle 402 (e.g., one or more of an x-, y-, z-position, roll, pitch, or yaw). For example, the localization component 420 may include and/or request/receive a map of an environment, such as from map(s) 430, and may continuously determine a location and/or orientation of the vehicle 402 within the environment. In some instances, the localization component 420 may utilize SLAM (simultaneous localization and mapping), CLAMS (calibration, localization and mapping, simultaneously), relative SLAM, bundle adjustment, non-linear least squares optimization, or the like to receive image data, lidar data, radar data, inertial measurement unit (IMU) data, GPS data, wheel encoder data, and the like to accurately determine a location of the vehicle 402. In some instances, the localization component 420 may provide data to various components of the vehicle 402 to determine an initial position of the vehicle 402 for determining the relevance of an object to the vehicle 402, as discussed herein.

In some instances, the perception component 422 may include functionality to perform object detecting, segmentation, and/or classification. In some examples, the perception component 422 may provide processed sensor data that indicates a presence of an object (e.g., entity) that is proximate to the vehicle 402 and/or a classification of the object as an object type (e.g., car, pedestrian, cyclist, animal, building, tree, road surface, curb, sidewalk, unknown, etc.). In some examples, the perception component 422 may provide processed sensor data that indicates a presence of a stationary entity that is proximate to the vehicle 402 and/or a classification of the stationary entity as a type (e.g., building, tree, road surface, curb, sidewalk, unknown, etc.). In additional or alternative examples, the perception component 422 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

The prediction component 426 may generate one or more probability maps representing prediction probabilities of possible locations of one or more objects in an environment. For example, the prediction component 426 may generate one or more probability maps for vehicles, pedestrians, animals, and the like within a threshold distance from the vehicle 402. In some instances, the prediction component 426 may measure a track of an object and generate a discretized prediction probability map, a heat map, a probability distribution, a discretized probability distribution, and/or a trajectory for the object based on observed and predicted behavior. In some instances, the one or more probability maps may represent an intent of the one or more objects in the environment.

In some examples, the prediction component 426 may generate predicted trajectories of objects (e.g., objects) in an environment. For example, the prediction component 426 may generate one or more predicted trajectories for objects within a threshold distance from the vehicle 402. In some examples, the prediction component 426 may measure a trace of an object and generate a trajectory for the object based on observed and predicted behavior.

In general, the planner component 428 may determine a path for the vehicle 402 to follow to traverse through an environment. For example, the planner component 428 may determine various routes and trajectories and various levels of detail. For example, the planner component 428 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planner component 428 may generate an instruction for guiding the vehicle 402 along at least a portion of the route from the first location to the second location. In at least one example, the planner component 428 may determine how to guide the vehicle 402 from a first waypoint in the sequence of waypoints to a second waypoint in the sequence of waypoints. In some examples, the instruction may be a candidate trajectory, or a portion of a trajectory. In some examples, multiple trajectories may be substantially simultaneously generated (e.g., within technical tolerances) in accordance with a receding horizon technique. A single path of the multiple paths in a receding data horizon having the highest confidence level may be selected to operate the vehicle. In various examples, the planner component 428 may select a trajectory for the vehicle 402.

In other examples, the planner component 428 may alternatively, or additionally, use data from the localization component 420, the perception component 422, and/or the prediction component 426 to determine a path for the vehicle 402 to follow to traverse through an environment. For example, the planner component 428 may receive data (e.g., object data) from the localization component 420, the perception component 422, and/or the prediction component 426 regarding objects associated with an environment. In some examples, the planner component 428 receives data for relevant objects within the environment. Using this data, the planner component 428 may determine a route to travel from a first location (e.g., a current location) to a second location (e.g., a target location) to avoid objects in an environment. In at least some examples, such a planner component 428 may determine there is no such collision-free path and, in turn, provide a path that brings vehicle 402 to a safe stop avoiding all collisions and/or otherwise mitigating damage.

The classifying component 424 may perform any of the techniques described with respect to any of FIGS. 1-3F above with respect to detecting and/or classifying data associated with an environment.

In at least one example, the vehicle computing device 404 may include one or more system controllers 432, which may be configured to control steering, propulsion, braking, safety, emitters, communication, and other systems of the vehicle 402. The system controller(s) 432 may communicate with and/or control corresponding systems of the drive system(s) 414 and/or other components of the vehicle 402.

The memory 418 may further include one or more maps 430 that may be used by the vehicle 402 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 402 may be controlled based at least in part on the map(s) 430. That is, the map(s) 430 may be used in connection with the localization component 420, the perception component 422, the prediction component 426, and/or the planner component 428 to determine a location of the vehicle 402, detect objects in an environment, generate routes, determine actions and/or trajectories to navigate within an environment.

In some examples, the one or more maps 430 may be stored on a remote computing device(s) (such as the computing device(s) 436) accessible via network(s) 434. In some examples, multiple maps 430 may be stored based on, for example, a characteristic (e.g., type of entity, time of day, day of week, season of the year, etc.). Storing multiple maps 430 may have similar memory requirements, but increase the speed at which data in a map may be accessed.

In some instances, aspects of some or all of the components discussed herein may include any models, techniques, and/or machine-learned techniques. For example, in some instances, the components in the memory 418 (and the memory 440, discussed below) may be implemented as a neural network.

As described herein, an exemplary neural network is a technique which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet-50, ResNet-101, VGG, DenseNet, PointNet, Xception, ConvNeXt, and the like; visual transformer(s) (ViT(s)), such as a bidirectional encoder from image transformers (BEiT), visual bidirectional encoder from transformers (VisualBERT), image generative pre-trained transformer (Image GPT), data-efficient image transformers (DeiT), deeper vision transformer (DeepViT), convolutional vision transformer (CvT), detection transformer (DETR), Miti-DETR, or the like; and/or general or natural language processing transformers, such as BERT, GPT, GPT-2, GPT-3, or the like. In some examples, the ML model discussed herein may comprise PointPillars, SECOND, top-down feature layers (e.g., see U.S. patent application Ser. No. 15/963,833, which is incorporated by reference in its entirety herein for all purposes), and/or VoxelNet. Architecture latency optimizations may include MobilenetV2, Shufflenet, Channelnet, Peleenet, and/or the like. The ML model may comprise a residual block such as Pixor, in some examples.

In at least one example, the sensor system(s) 406 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 406 may include multiple instances of each of these or other types of sensors. For instance, the lidar sensors may include individual lidar sensors located at the corners, front, back, sides, and/or top of the vehicle 402. As another example, the camera sensors may include multiple cameras disposed at various locations about the exterior and/or interior of the vehicle 402. The sensor system(s) 406 may provide input to the vehicle computing device 404. Additionally, or in the alternative, the sensor system(s) 406 may send sensor data, via the one or more networks 434, to the one or more computing device(s) 436 at a particular frequency, after a lapse of a predetermined period of time, in near real-time, etc.

The vehicle 402 may also include one or more emitters 408 for emitting light and/or sound. The emitter(s) 408 may include interior audio and visual emitters to communicate with passengers of the vehicle 402. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 408 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 402 may also include one or more communication connections 410 that enable communication between the vehicle 402 and one or more other local or remote computing device(s). For instance, the communication connection(s) 410 may facilitate communication with other local computing device(s) on the vehicle 402 and/or the drive system(s) 414. Also, the communication connection(s) 410 may allow the vehicle to communicate with other nearby computing device(s) (e.g., computing device 436, other nearby vehicles, etc.) and/or one or more remote sensor system(s) for receiving sensor data. The communications connection(s) 410 also enable the vehicle 402 to communicate with a remote teleoperations computing device or other remote services.

The communications connection(s) 410 may include physical and/or logical interfaces for connecting the vehicle computing device 404 to another computing device or a network, such as network(s) 434. For example, the communications connection(s) 410 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 402 may include one or more drive systems 414. In some examples, the vehicle 402 may have a single drive system 414. In at least one example, if the vehicle 402 has multiple drive systems 414, individual drive systems 414 may be positioned on opposite ends of the vehicle 402 (e.g., the front and the rear, etc.). In at least one example, the drive system(s) 414 may include one or more sensor systems to detect conditions of the drive system(s) 414 and/or the surroundings of the vehicle 402. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 414. In some cases, the sensor system(s) on the drive system(s) 414 may overlap or supplement corresponding systems of the vehicle 402 (e.g., sensor system(s) 406).

The drive system(s) 414 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 414 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 414. Furthermore, the drive system(s) 414 may also include one or more communication connection(s) that enable communication by the respective drive module with one or more other local or remote computing device(s).

In at least one example, the direct connection 412 may provide a physical interface to couple the one or more drive system(s) 414 with the body of the vehicle 402. For example, the direct connection 412 may allow the transfer of energy, fluids, air, data, etc. between the drive system(s) 414 and the vehicle. In some instances, the direct connection 412 may further releasably secure the drive system(s) 414 to the body of the vehicle 402.

In at least one example, the localization component 420, the perception component 422, the classifying component 424, the prediction component 426, the planner component 428, the one or more system controllers 432, and the one or more maps 430 may process sensor data, as described above, and may send their respective outputs, over the one or more network(s) 434, to the computing device(s) 436. In at least one example, the localization component 420, the perception component 422, the classifying component 424, the prediction component 426, the planner component 428, the one or more system controllers 432, and the one or more maps 430 may send their respective outputs to the computing device(s) 436 at a particular frequency, after a lapse of a predetermined period of time, in near real-time, etc.

In some examples, the vehicle 402 may send sensor data to the computing device(s) 436 via the network(s) 434. In some examples, the vehicle 402 may receive sensor data from the computing device(s) 436 and/or remote sensor system(s) via the network(s) 434. The sensor data may include raw sensor data and/or processed sensor data and/or representations of sensor data. In some examples, the sensor data (raw or processed) may be sent and/or received as one or more log files.

The computing device(s) 436 may include processor(s) 438 and a memory 440, which may include a scene embedding generating component 442, a sensor embedding generating component 444, an embedding concatenating component 446, and/or an scenario identifying component 448. In some examples, the memory 440 may store one or more of components that are similar to the component(s) stored in the memory 418 of the vehicle 402. In such examples, the computing device(s) 436 may be configured to perform one or more of the processes described herein with respect to the vehicle 402. In some examples, the scene embedding generating component 442, the sensor embedding generating component 444, the embedding concatenating component 446, and/or the scenario identifying component 448 may perform substantially similar functions as the classifying component 424.

The processor(s) 416 of the vehicle 402 and the processor(s) 438 of the computing device(s) 436 may be any suitable processor capable of executing instructions to process data and perform operations as described herein. By way of example and not limitation, the processor(s) may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 418 and memory 440 are examples of non-transitory computer-readable media. The memory 418 and memory 440 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 4 is illustrated as a distributed system, in alternative examples, components of the vehicle 402 may be associated with the computing device(s) 436 and/or components of the computing device(s) 436 may be associated with the vehicle 402. That is, the vehicle 402 may perform one or more of the functions associated with the computing device(s) 436, and vice versa.

The methods described herein represent sequences of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes. In some examples, one or more operations of the method may be omitted entirely. For instance, the operations may include determining a first action and a second action by the vehicle relative to a selected trajectory without determining a respective cost for one or more of the actions by the vehicle. Moreover, the methods described herein may be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Figure 5:
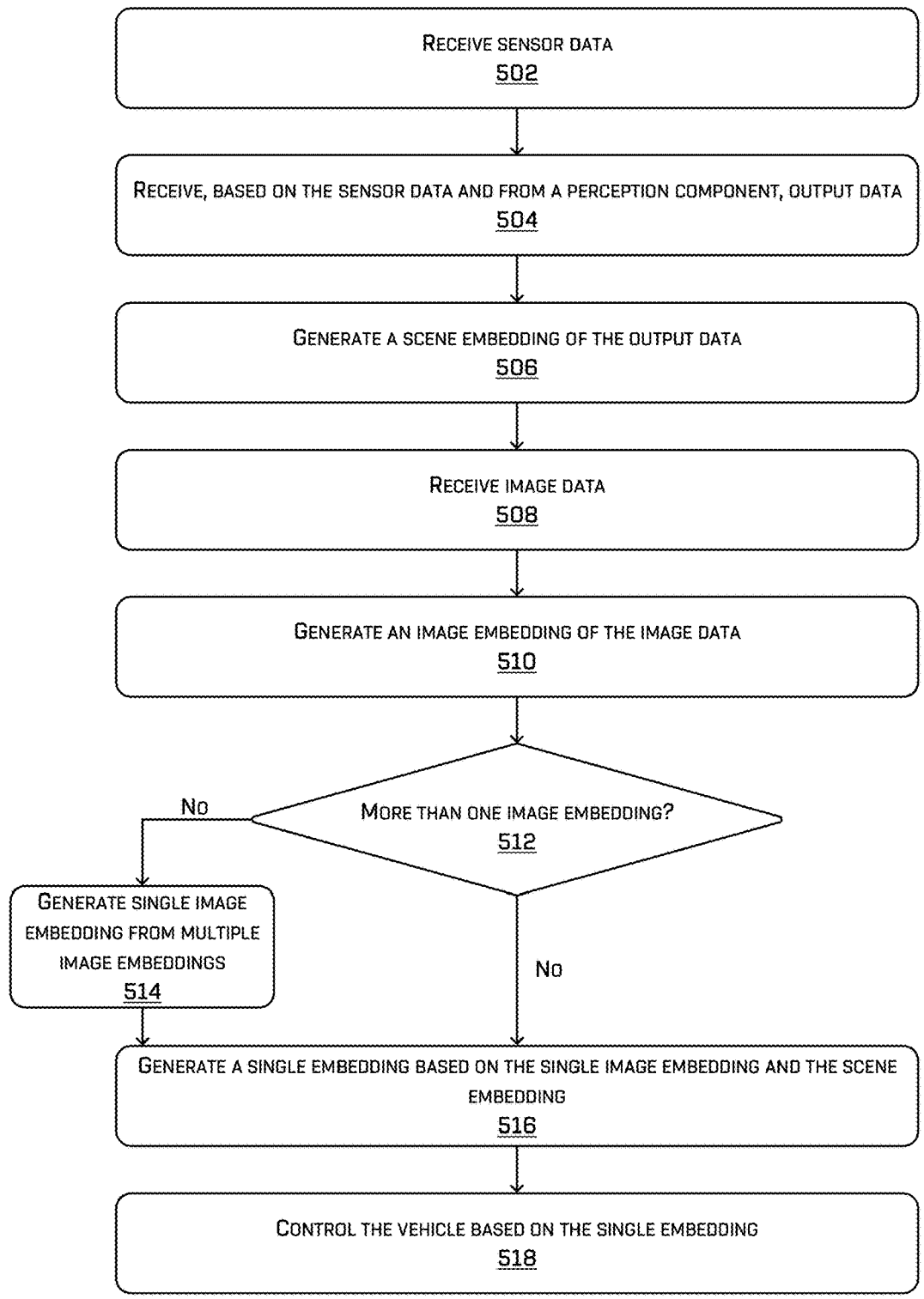
FIG. 5 is a flow diagram illustrating an example process for receiving a scene embedding, determining an image embedding, generating a single embedding based on the scene embedding and the image embedding, and controlling the vehicle based on the single embedding, in accordance with one or more examples of the disclosure.

FIG. 5 is a flow diagram illustrating an example process 500 for receiving a scene embedding, determining an image embedding, generating a single embedding based on the scene embedding and the image embedding, and controlling the vehicle based on the single embedding. As described below, the example process 500 may be performed by one or more computer computer-based components configured to implement various functionalities described herein. For instance, process 500 may be performed by a classifying component 202. As described above, the classifying component 202 may be integrated as a separate server-based system.

Process 500 is illustrated as collections of blocks in a logical flow diagram, representing sequences of operations, some or all of which can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, encryption, deciphering, compressing, recording, data structures, and the like that perform particular functions or implement particular abstract data types. The order in which the operations are described should not be construed as a limitation. Any number of the described blocks can be combined in any order and/or in parallel to implement the processes, or alternative processes, and not all of the blocks need to be executed in all examples. For discussion purposes, the processes herein are described in reference to the frameworks, architectures and environments described in the examples herein, although the processes may be implemented in a wide variety of other frameworks, architectures or environments.

At operation 502, the classifying component may receive sensor data. In some examples, the vehicle may include multiple sensor devices (e.g., lidar device(s), radar device(s), time-of-flight device(s), image capturing device(s), infrared device(s), etc.) configured to receive sensor data of the environment. Such sensor devices may be located at any location on or in the vehicle and may capture sensor data of any portion of the environment. In some examples, each sensor device may provide unique sensor data representative of the perspective of the particular sensor.

At operation 504, the classifying component may receive, based on the sensor data and from a perception component, output data. That is, the vehicle may rely on one or more subsystems and/or components to process and/or interpret the sensor data. For example, the vehicle may include a perception component which may be configured to detect and/or classify object(s) within the environment. Further, the vehicle may include a localization component which may be configured to determine a pose of the vehicle within the world. In such cases, the vehicle may input the sensor data into such components. Based on receiving the sensor data, the perception and/or localization component(s) may analyze the sensor data and output various types of scene data. The scene data may include bounding boxes, classifications, extents, velocities, accelerations, traffic light states, track data, road network data, etc.

At operation 506, the classifying component may generate a scene embedding of the output data. The classifying component may input the scene data into a machine learned model which may be trained to generate an embedding of the scene data. An embedding may be a structured form of representing data, characteristics, and/or features of an object. In this example, the classifying component may generate an embedding for some or all aspects of the scene data. As an example, if the scene data includes three bounding boxes, the classifying component may generate a unique embedding for each of the three bounding boxes. Based on generating the embeddings for each piece of data in the scene data, the classifying component may determine a single embedding for each type of scene data. That is, continuing the example above, for the three bounding boxes, the classifying component may determine a single bounding box embedding by mean pooling the three bounding box embeddings. As such, the classifying component may determine a single embedding for each type of data in the scene data.

In some examples, the classifying component may generate a single scene embedding based on the various embeddings of the type(s) of data in the scene data. The classifying component may determine the single scene embedding by concatenating the multiple scene embeddings together. Concatenating the embeddings may include combining the multiple embeddings into a single embedding such that the data from each embedding is included in the single scene embedding. As described in more detail below, the classifying component may combine the single scene embedding with the image embedding (described below).

At operation 508, the classifying component may receive image data. That is, the vehicle may include one or more image capturing devices configured to capture image data. The image data may be represented in a two-dimensional plane and may include one or more pixels organized in rows and columns.

At operation 510, the classifying component may generate an image embedding of the image data. That is, the classifying component may generate the image embedding prior to inputting the image data into the perception and/or localization components. The classifying component may generate the image embedding by inputting the image data into a machine learned model which may be trained to provide, as output, an image embedding. In some cases, the classifying component may input the entire image data into the machine learned model; however, in other cases, the classifying component may input sections or portions of the image data into the machine learned model.

At operation 512, the classifying component may determine whether there are more than one image embedding. That is, if the classifying component uses portions of the image data to generate the image embedding, the classifying component may receive multiple image embeddings. That is, as described above, the classifying component may receive an embedding for each portion of the image that was input into the machine learned model. As such, if the classifying component does include multiple image embeddings (512:Yes), the classifying component may generate a single combined embeddings from the multiple image embeddings. That is, at operation 514, the classifying component may generate a single image embedding from the multiple image embeddings by concatenating the multiple image embeddings.

At operation 516, the classifying component may generate a combined embedding based on the single image embedding and the scene embedding. That is, based on determining the combined scene embedding and the combined image embedding, the classifying component may generate a combined embedding by concatenating the image embedding with the scene embedding.

At operation 518, the classifying component may control the vehicle based on the single embedding. That is, based on detecting and/or classifying object(s) within the environment, the classifying component may send such data to downstream components such as prediction and/or planning. The downstream components may analyze the detected and/or classified data to determine actions for the vehicle to perform.

EXAMPLE CLAUSES

A: A system comprising: one or more processors; and one or more non-transitory computer-readable media storing computer-executable instructions that, when executed, cause the system to perform operations comprising: receiving, from a sensor device associated with an autonomous vehicle, sensor data of an environment; determining, based at least in part on the sensor data, perception data; generating a scene representation associated with the perception data; receiving, from an image capturing device of the autonomous vehicle, image data of the environment; generating an image representation associated with the image data; generating, based at least in part on the scene representation and the image representation, an aggregated representation; inputting the aggregated representation into a machine learned model; receiving, from the machine learned model, data associated with the environment; and controlling the autonomous vehicle based at least in part on data.

B: The system of paragraph A, wherein determining the image representation comprises: determining a first portion of the image data and a second different portion of the image data, wherein the image representation is determined based at least in part on a subset of the image data including the first portion and excluding the second different portion.

C: The system of paragraph B, wherein determining the first portion of the image data comprises: receiving a bounding box; projecting the bounding box into the image data; and receiving pixels positioned within the bounding box, wherein determining the image representation is based at least in part on the pixels.

D: The system of paragraph C, wherein the bounding box is determined based at least in part on at least one of: receiving the bounding box from the perception data, or determining, based at least in part on inputting the image data into a second machine learned model, the bounding box.

E: The system of paragraph C, the operations further comprising: identifying a plurality of representations associated with the perception data; identifying a representation of the plurality of representations that is associated with the bounding box; and aggregating the representation with the image representation.

F: One or more non-transitory computer-readable media storing instructions executable by one or more processors, wherein the instructions, when executed, cause a system to perform operations comprising: receiving, from a sensor associated with a vehicle, sensor data of an environment; determining, based at least in part on the sensor data, a scene representation; determining, based at least in part on the sensor data, a sensor data representation; determining, based at least in part on the sensor data representation and the scene representation, a combined representation; inputting the combined representation into a machine learned model; and controlling the vehicle based at least in part on an output of the machine learned model.

G: The one or more non-transitory computer-readable media of paragraph F, wherein determining the sensor data representation comprises: determining a first portion of the sensor data and a second different portion of the sensor data, wherein the sensor data representation is determined based at least in part on a subset of the sensor data including the first portion and excluding the second different portion.

H: The one or more non-transitory computer-readable media of paragraph G, wherein determining the first portion of the sensor data comprises: receiving a bounding box; projecting the bounding box into the sensor data; and receiving data positioned within the bounding box, wherein determining the sensor data representation is based at least in part on the data.

I: The one or more non-transitory computer-readable media of paragraph H, wherein the bounding box is determined based at least in part on at least one of: receiving the bounding box from perception data associated with the vehicle, or determining, based at least in part on inputting the sensor data into a machine learned model, the bounding box.

J: The one or more non-transitory computer-readable media of paragraph H, the operations further comprising: determining a plurality of representations associated with the sensor data; determining, as the sensor data representation, a representation from the plurality of representations that is associated with the bounding box; and aggregating, as the combined representation, the sensor data representation with the scene representation.

K: The one or more non-transitory computer-readable media of paragraph F, wherein determining the scene representation comprises: determining a plurality of a type of data included in data output, wherein the output includes perception data; determining a plurality of representations based at least in part on the plurality of the type of data; and determining, based at least in part on performing an aggregation operation on the plurality of representations, a single representation associated with the type of data.

L: The one or more non-transitory computer-readable media of paragraph F, wherein the sensor data used to determine the sensor data representation is at least one of: image data, lidar data, radar data, audio data, environmental data, or time-of-flight data.

M: The one or more non-transitory computer-readable media of paragraph F, wherein controlling the vehicle is based at least in part on: receiving, from the machine learned model, a classification of data within the sensor data, wherein controlling the vehicle is based at least in part on the classification.

N: A method comprising: receiving, from a sensor associated with a vehicle, sensor data of an environment; determining, based at least in part on the sensor data, a scene representation; determining, based at least in part on the sensor data, a sensor data representation; determining, based at least in part on the sensor data representation and the scene representation, a combined representation; inputting the combined representation into a machine learned model; and controlling the vehicle based at least in part on an output of the machine learned model.

O: The method of paragraph N, wherein determining the sensor data representation comprises: determining a first portion of the sensor data and a second different portion of the sensor data, wherein the sensor data representation is determined based at least in part on a subset of the sensor data including the first portion and excluding the second different portion.

P: The method of paragraph O, wherein determining the first portion of the sensor data comprises: receiving a bounding box; projecting the bounding box into the sensor data; and receiving data positioned within the bounding box, wherein determining the sensor data representation is based at least in part on the data.

Q: The method of paragraph P, wherein the bounding box is determined based at least in part on at least one of: receiving the bounding box from perception data associated with the vehicle, or determining, based at least in part on inputting the sensor data into a machine learned model, the bounding box.

R: The method of paragraph Q, further comprising: determining a plurality of representations associated with the sensor data; determining, as the sensor data representation, a representation from the plurality of representations that is associated with the bounding box; and aggregating, as the combined representation, the sensor data representation with the scene representation.

S: The method of paragraph N, wherein determining the scene representation comprises: determining a plurality of a type of data included in data output, wherein the output includes perception data; determining a plurality of representations based at least in part on the plurality of the type of data; and determining, based at least in part on performing an aggregation operation on the plurality of representations, a single representation associated with the type of data.

T: The method of paragraph N, wherein the sensor data used to determine the sensor data representation is at least one of: image data, lidar data, radar data, audio data, environmental data, or time-of-flight data.

While the example clauses described above are described with respect to particular implementations, it should be understood that, in the context of this document, the content of the example clauses can be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
one or more processors; and
one or more non-transitory computer-readable media storing computer-executable instructions that, when executed, cause the system to perform operations comprising:
receiving, from a sensor device associated with an autonomous vehicle, sensor data of an environment;
determining, based at least in part on the sensor data, perception data;
generating a scene representation associated with the perception data;
receiving, from an image capturing device of the autonomous vehicle, image data of the environment;
generating an image representation associated with the image data;
generating, based at least in part on the scene representation and the image representation, an aggregated representation;
inputting the aggregated representation into a machine learned model;
receiving, from the machine learned model, data associated with the environment; and
controlling the autonomous vehicle based at least in part on data.

2. The system of claim 1, wherein determining the image representation comprises:
determining a first portion of the image data and a second different portion of the image data, wherein the image representation is determined based at least in part on a subset of the image data including the first portion and excluding the second different portion.

3. The system of claim 2, wherein determining the first portion of the image data comprises:
receiving a bounding box;
projecting the bounding box into the image data; and
receiving pixels positioned within the bounding box, wherein determining the image representation is based at least in part on the pixels.

4. The system of claim 3, wherein the bounding box is determined based at least in part on at least one of:
receiving the bounding box from the perception data, or
determining, based at least in part on inputting the image data into a second machine learned model, the bounding box.

5. The system of claim 3, the operations further comprising:
identifying a plurality of representations associated with the perception data;
identifying a representation of the plurality of representations that is associated with the bounding box; and
aggregating the representation with the image representation.

6. One or more non-transitory computer-readable media storing instructions executable by one or more processors, wherein the instructions, when executed, cause a system to perform operations comprising:
receiving, from a sensor associated with a vehicle, sensor data of an environment;
determining, based at least in part on the sensor data, a scene representation;
determining, based at least in part on the sensor data, a sensor data representation;
determining, based at least in part on the sensor data representation and the scene representation, a combined representation;
inputting the combined representation into a machine learned model; and
controlling the vehicle based at least in part on an output of the machine learned model.

7. The one or more non-transitory computer-readable media of claim 6, wherein determining the sensor data representation comprises:
determining a first portion of the sensor data and a second different portion of the sensor data, wherein the sensor data representation is determined based at least in part on a subset of the sensor data including the first portion and excluding the second different portion.

8. The one or more non-transitory computer-readable media of claim 7, wherein determining the first portion of the sensor data comprises:
receiving a bounding box;
projecting the bounding box into the sensor data; and
receiving data positioned within the bounding box, wherein determining the sensor data representation is based at least in part on the data.

9. The one or more non-transitory computer-readable media of claim 8, wherein the bounding box is determined based at least in part on at least one of:
receiving the bounding box from perception data associated with the vehicle, or
determining, based at least in part on inputting the sensor data into a machine learned model, the bounding box.

10. The one or more non-transitory computer-readable media of claim 8, the operations further comprising:
determining a plurality of representations associated with the sensor data;
determining, as the sensor data representation, a representation from the plurality of representations that is associated with the bounding box; and
aggregating, as the combined representation, the sensor data representation with the scene representation.

11. The one or more non-transitory computer-readable media of claim 6, wherein determining the scene representation comprises:
determining a plurality of a type of data included in data output, wherein the output includes perception data;

determining a plurality of representations based at least in part on the plurality of the type of data; and determining, based at least in part on performing an aggregation operation on the plurality of representations, a single representation associated with the type of data.

12. The one or more non-transitory computer-readable media of claim 6, wherein the sensor data used to determine the sensor data representation is at least one of:
   image data,
   lidar data,
   radar data,
   audio data,
   environmental data, or
   time-of-flight data.

13. The one or more non-transitory computer-readable media of claim 6, wherein controlling the vehicle is based at least in part on:
   receiving, from the machine learned model, a classification of data within the sensor data, wherein controlling the vehicle is based at least in part on the classification.

14. A method comprising:
   receiving, from a sensor associated with a vehicle, sensor data of an environment;
   determining, based at least in part on the sensor data, a scene representation;
   determining, based at least in part on the sensor data, a sensor data representation;
   determining, based at least in part on the sensor data representation and the scene representation, a combined representation;
   inputting the combined representation into a machine learned model; and
   controlling the vehicle based at least in part on an output of the machine learned model.

15. The method of claim 14, wherein determining the sensor data representation comprises:
   determining a first portion of the sensor data and a second different portion of the sensor data, wherein the sensor data representation is determined based at least in part on a subset of the sensor data including the first portion and excluding the second different portion.

16. The method of claim 15, wherein determining the first portion of the sensor data comprises:
   receiving a bounding box;
   projecting the bounding box into the sensor data; and
   receiving data positioned within the bounding box, wherein determining the sensor data representation is based at least in part on the data.

17. The method of claim 16, wherein the bounding box is determined based at least in part on at least one of:
   receiving the bounding box from perception data associated with the vehicle, or
   determining, based at least in part on inputting the sensor data into a machine learned model, the bounding box.

18. The method of claim 17, further comprising:
   determining a plurality of representations associated with the sensor data;
   determining, as the sensor data representation, a representation from the plurality of representations that is associated with the bounding box; and
   aggregating, as the combined representation, the sensor data representation with the scene representation.

19. The method of claim 14, wherein determining the scene representation comprises:
   determining a plurality of a type of data included in data output, wherein the output includes perception data;
   determining a plurality of representations based at least in part on the plurality of the type of data; and
   determining, based at least in part on performing an aggregation operation on the plurality of representations, a single representation associated with the type of data.

20. The method of claim 14, wherein the sensor data used to determine the sensor data representation is at least one of:
   image data,
   lidar data,
   radar data,
   audio data,
   environmental data, or
   time-of-flight data.

* * * * *